3,151,129
NEW HALOGEN-CONTAINING GLYCIDYL ETHERS

Ernst Leumann and Hans Batzer, Arlesheim, Switzerland, assignors to Ciba Limited, Basel, Switzerland, a company of Switzerland
No Drawing. Filed Sept. 12, 1961, Ser. No. 137,522
Claims priority, application Switzerland Sept. 15, 1960
5 Claims. (Cl. 260—348)

The present invention provides new halogenated glycidyl ethers of the general formula

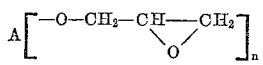

where $n$ is a small whole number and A represents a cycloaliphatic radical with $n$ free valencies which contains at least one grouping of the formula

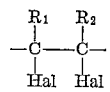

where the two radicals Hal represent vicinal halogen atoms, more especially chlorine or bromine atoms, and $R_1$ and $R_2$ each represents a hydrogen or halogen atom or a lower alkyl radical.

The new glycidyl ethers can be prepared by adding halogen on to the double or triple bond respectively in glycerol monohalohydrin ethers or glycidyl ethers of cycloaliphatic monoalcohols or polyalcohols containing at least one grouping of the formula

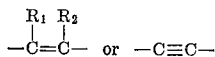

where $R_1$ and $R_2$ have the above meanings, and, as the case may be, the halohydrin group or groups is/are then dehydrohalogenated.

Alternatively, the new glycidyl ethers are also obtained by reacting a cycloaliphatic monoalcohol or polyalcohol that contains at least one grouping of the formula

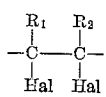

where $R_1$ and $R_2$ have the above meanings, with an epihalohydrin or a glycerol monohalohydrin and the intermediately formed halohydrin group or groups is/are dehydrohalogenated.

Suitable unsaturated cycloaliphatic monoalcohols or polyalcohols, from which the monohalohydrin ethers or glycidyl ethers respectively are derived, are, for example: Cyclohexene-3-ol-1, $\Delta^3$-tetrahydrobenzyl alcohol, 6-methyl-$\Delta^3$-tetrahydrobenzyl alcohol, 2:5-endomethylene-$\Delta^3$-tetrahydrobenzyl alcohol, dihydrodicyclopentadienol-8, $\Delta^3$-cyclohexene-1:1-dimethanol, 6-methyl-$\Delta^3$-cyclohexene-1:1-dimethanol and 2:5-endomethylene-$\Delta^3$-cyclohexene-1:1-dimethanol.

Preferred starting materials are glycerol monochlorohydrin ethers which are first halogenated and then dehydrohalogenated to the corresponding glycidyl ethers. In this connection it is extremely surprising that the halogenation proceeds smoothly and without any noticeable side reactions; this could not have been expected since it is known that in general the halogenation of unsaturated glycols gives poor to unsatisfactory yields. For example, the chlorination of butyne-2-diol-1:4 gives a yield of only 35% of 2:2:3:3-tetrachlorobutanediol-1:4- in addition to a substantial proportion of resinification products.

When, instead of the monohalohydrin ether, the glycidyl ether is directly halogenated, the resulting yields of the products of the invention are inferior, because side reactions occur that cause the epoxide ring to be split.

The halogenation of the unsaturated monochlorohydrin ethers or glycidyl ethers respectively is advantageously performed by reacting the halogen, more especially $Cl_2$ or $Br_2$, upon the unsaturated ether in a suitable solvent such as carbon tetrachloride or benzene, for example at a temperature ranging from 0 to 25° C., advantageously from 5 to 15° C. The amount of halogen introduced or used from the start should be sufficient to ensure that the double or triple bond of the unsaturated ether is quantitatively saturated.

The optionally performed subsequent elimination of hydrogen halide in the case of the halohydrins or chlorohydrins is carried out in known manner with solid alkalies or aqueous alkali solutions.

Among the new glycidy ethers of the invention those of the general formula

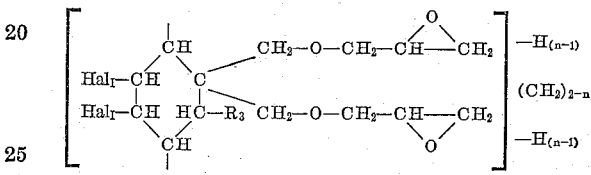

where the two radicals $Hal_1$ represent chlorine or bromine atoms, $R_3$ represents a hydrogen atom or a methyl group, and $n=1$ or 2, are particularly easy to manufacture.

The halogenated glycidyl ethers of the invention—in contradistinction to the hitherto known chlorine-containing epoxy resins—are only slightly tinted, and, more especially, the derivatives of $\Delta^3$-cyclohexene-1:1-dimethanol are surprisingly almost completely colorless. Furthermore, some of them are of very low viscosity. The new diglycidyl and polyglycidyl ethers react with the conventional curing agents for epoxy resins so that they can be cured cold or with heating by the addition of such curing agents in the same manner as other polyfunctional epoxy compounds. As such curing agents there may be used either basic or acidic compounds. Particularly good results have been achieved with: Amines and amides, such as aliphatic and aromatic primary, secondary and tertiary amines, for example mono-, di- and tri-butyl-amines, paraphenylenediamine, 4:4'-diaminodiphenylmethane, ethylenediamine, N-hydroxyethyl-ethylenediamine, N:N-diethyl-ethylenediamine, diethylenetriamine, metaxylylenediamine, triethylenetetramine, trimethylamine, diethylamine, triethanolamine, Mannich's bases, piperidine, piperazine, guanidine and guanidine derivatives, such as phenyldiguanidine, diphenylguanidine, dicyandiamide, formaldehyde resins of urea, melamine or aniline; polymers of aminostyrenes; polyamides, for example those of dimerized or trimerized unsaturated fatty acids and alkylene-polyamines; isocyanates, isothiocyanates, phosphoric acid, polybasic carboxylic acids and their anhydrides, for example phthalic anhydride, methyl-endomethylene-tetrahydrophthalic anhydride, dodecenylsuccinic anhydride, hexahydrophthalic anhydride, hexachloro-endomethylene-tetrahydrophthalic anhydride or endomethylene-tetrahydrophthalic anhydride, or mixtures thereof; maleic or succinic anhydride; polyhydric phenols, for example resorcinol, hydroquinone, quinone, phenolaldehyde resins, oil-modified phenolaldehyde resins; reaction products of aluminum alcoholates or phenolates with tautomers of the type of acetoacetic acid esters; Friedel-Crafts catalysts, for example aluminum chloride, antimony pentachloride, tin tetrachloride, ferric chloride, zinc chloride, boron trifluoride and complexes thereof with organic compounds; metal fluoborates, for example nickel fluoborate; boroxines such as trimethoxyboroxine. The monoglycidyl ethers of the invention by themselves likewise react with the afore-mentioned curing agents, but in most cases linear reaction products are obtained that are not cross-linked. They can be cross-linked or cured, for example, with polybasic carboxylic acids and anhydrides thereof. The term "curing" as used in this connection signifies the conversion of the glycidyl ethers into insoluble and infusible resins.

The curable glycidyl ethers, or their mixtures with curing agents, can be admixed at any stage prior to the curing with other flame-proofing agents such, for example, as phosphates, or with fillers, softening agents, coloring matter and similar products. Suitable extenders and fillers are, for example, asphalt, bitumen, glass fibers, mica, quartz meal, cellulose, kaolin, finely dispersed silicic acid (Aerosil) or metal powders.

The mixtures of the new glycidyl ethers and the curing agents can be used without or with fillers, in solution or emulsion, as textile assistants, laminating resins, lacquers, varnishes, paints, dipping or casting resins, coating compositions, pore fillers and putties, adhesives or the like, or for the manufacture of such products.

The new glycidyl ethers can also be used as intermediates and as flame-proofing active diluents or modifying agents for the known epoxy resins, such for example, as are obtained by reacting epichlorohydrin upon a polyhydric phenol, such as resorcinol or bis-[4-hydroxyphenyl]-dimethylmethane, in an alkaline medium.

In the following examples parts and percentages are by weight, and the relationship between part by weight and part by volume is the same as that between the kilogram and the liter. The epoxide contents shown as "epoxide equivalents per kg." have been determined by the method described by A. J. Durbetaki in "Analytical Chemistry," volume 28, No. 12, December 1956, pages 2000–2001, with hydrogen bromide in glacial acetic acid.

Example 1

A reaction vessel equipped with stirrer, thermometer, gas inlet tube and cooling bath is charged with a suspension of 327 parts (1 mol) of $\Delta^3$-cyclohexene-1:1-dimethanol-bis($\alpha$-monochlorohydrin)ether in 200 parts by volume of carbon tetrachloride. While stirring the suspension well there are introduced at 10 to 15° C. within 1 hour 71 parts (1 mol) of chlorine. While continuing to cool the mixture well, it is treated dropwise with 240 parts (3 mols) of sodium hydroxide solution of 50% at a rate such that the temperature does not exceed 35° C. Initially, the reaction is strongly exothermic, but towards the end it is no longer necessary to cool. To complete the elimination of hydrogen chloride the mixture is stirred on for 30 minutes at 50° C., then cooled, the sodium chloride formed is dissolved by adding 300 parts by volume of water, and the organic phase is separated, dried over calcium chloride and evaporated under vacuum, to yield 298 parts of an almost colorless, medium viscous liquid which contains, per kg., 4.05 epoxide equivalents and 6.98 equivalents of chlorine. The product consists predominantly of the dichlorinated diglycidyl ether of the formula

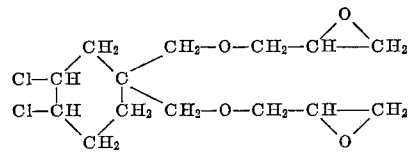

When this compound is cured for 24 hours at 140° C. with 0.85 mol of phthalic anhydride per equivalent of epoxide groups, with addition of 13.5% of trixylenylphosphate, the castings so obtained display a VDE flammability value of 39 seconds.

Example 2

In the reaction vessel used in Example 1 (the gas inlet tube being replaced by a dropping funnel) 327 parts (1 mol) of $\Delta^3$-cyclohexene-1:1-dimethanol-bis($\alpha$-monochlorohydrin)ether are suspended in 100 parts by volume of carbon tetrachloride. A solution of 160 parts (1 mol) of bromine in 200 parts by volume of carbon tetrachloride is then added dropwise from the dropping funnel at a temperature of 10 to 15° C. within 1½ hours. As described in Example 1, 240 parts (3 mols) of sodium hydroxide solution of 50% strength are then dropped in and the mixture is stirred for 30 minutes at 50° C. and then cooled; the precipitated sodium chloride is dissolved by adding 300 parts by volume of water, and the organic phase is separated and worked up as described in Example 1, to yield 401 parts of a medium viscous, almost colorless liquid which contains, per kg., 4.1 epoxide equivalents and 6.25 equivalents of bromine. The product consists predominantly of the dibrominated diglycidyl ether of the formula

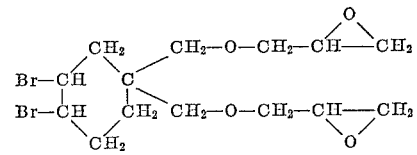

When this product is cured for 24 hours at room temperature with 0.2 mol of diethylenetriamine per equivalent of epoxide groups, with addition of 13.5% of trixylenylphosphate, the resulting castings display a VDE flammability value of 0.5 second.

When the compound is cured with 0.85 mol of phthalic anhydride per equivalent epoxide groups, with addition of 13.5% of trixylenylphosphate, for 24 hours at 140° C., castings are obtained that display a VDE flammability value of 0 seconds.

Example 3

254 parts (1 mol) of $\Delta^3$-cyclohexene-1:1-dimethanol-diglycidyl ether are dissolved in 300 cc. of benzene in the apparatus used in Example 1. In the course of 75 minutes 71 parts (1 mol) of chlorine are introduced at 8 to 10° C., and the solvent is then evaporated under vacuum, to yield 320 parts of a medium viscous liquid containing, per kg., 3.22 epoxide equivalents and 7.88 equivalents of chlorine; it consists predominantly of the dichlorinated diglycidyl ether described in Example 1.

Example 4

A solution of 254 parts (1 mol) of $\Delta^3$-cyclohexene-1:1-dimethanol-diglycidyl ether in 100 parts by volume of benzene is treated dropwise, within 1 hour at 5 to 10° C. with a solution of 160 parts (1 mol) of bromine in 200 parts by volume of benzene. The solvent is then evaporated under vacuum, to yield 397 parts of a liquid containing, per kg., 3.40 epoxide equivalents and 6.32 equivalents of bromine; it consists predominantly of the dibrominated diglycidyl ether described in Example 2.

Example 5

As described in Example 2, a solution of 204.5 parts (1 mol) of $\Delta^3$-tetrahydrobenzyl alcohol-$\alpha$-monochlorohydrin ether in 100 parts by volume of benzene is treated dropwise within 1 hour at 5 to 10° C. with a solution of 160 parts (1 mol) of bromine in 200 parts by volume of benzene.

The subsequent elimination of hydrogen chloride is carried out in two stages: First, 165 parts (1.5 mols) of sodium hydroxide solution of 36.4% strength are dropped into the reaction mixture and the temperature is allowed to rise to about 50° C.; the mixture is stirred for 30 minutes without cooling or heating, then cooled and treated with 100 parts by volume of water; the organic phase is separated and stirred for 40 minutes at 50° C. with 80 parts (1 mol) of sodium hydroxide solution of 50% strength, again cooled, 100 parts by volume of water are then added, and the organic phase is separated, dried over calcium chloride and evaporated under vacuum.

Yield: 291 parts of 3:4-dibromocyclohexane-1-methyl-glycidyl ether of the formula

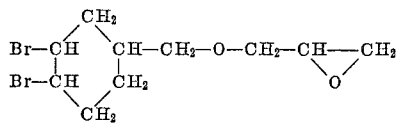

as a very mobile, almost colorless oil containing, per kg., 2.4 epoxide equivalents and 7.14 equivalents of bromine.

Example 6

In the course of 2 hours at 0 to 5° C., 71 parts (1 mol) of chlorine are introduced into a solution of 242.5 parts (1 mol) of α-monochlorohydrin ether of 8-hydroxy-dihydro-dicyclopentadiene (8-hydroxy-tricyclo[5.2.1.0$^{2,6}$]decene-4) in 100 parts by volume of benzene. The whole is then dilute with 100 parts by volume of benzene, and 165 parts (1.5 mols) of sodium hydroxide solution of 36.4% strength are added dropwise, while allowing the temperature to rise to about 50° C. The mixture is stirred for 30 minutes without cooling or heating, then cooled, and the product is worked up as described in Example 8 by treating it once more with 1 mol of sodium hydroxide solution of 50% strength for 40 minutes at 50° C. Finally, there are obtained 230.5 parts of the dichlorinated dihydro-dicyclo-pentadiene glycidyl ether of the formula

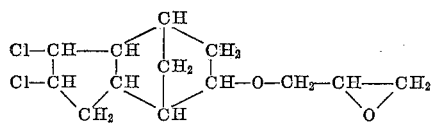

as a brown, viscous liquid containing 1.77 epoxide groups per kg. and 24.5% of chlorine.

Example 7

290 parts (0.96 mol) of 3:4-dibromocyclohexane-1:1-dimethanol (melting at 137–138° C.) are mixed with 300 parts of benzene and 2 parts of tin tetrachloride are added. The mixture is heated to 70° C., and in the course of 20 minutes 187 parts (2.02 mols) of epichlorohydrin are stirred in dropwise, while cooling to maintain the temperature at 70 to 75° C. The mixture is then stirred for 30 minutes at the same temperature, cooled to 25° C., and 324 parts (2.4 mols) of sodium hydroxide solution of 29.6% strength are added. During this addition the temperature rises only slightly and is maintained by heating for 1 hour at 70° C. The mixture is allowed to cool slightly, 100 parts of water are added to dissolve the salt, and the benzene layer is separated and stirred at 70° C. for 1 hour with 70 parts (0.96 mol) of sodium hydroxide solution of 50% strength. The whole is then allowed to cool slightly, 90 parts of water are added, and the benzene layer is separated, dried over calcium chloride and evaporated, to yield 391 parts of an almost colorless liquid having the same properties as the diglycidyl ether obtained in Example 2.

Example 8

A solution of 20 parts of the diglycidyl ether dibrominated as described in Example 2 in 8 parts of a mixture of 3 parts of butanol, 1 part of ethyleneglycol monoethyl ether and 4 parts of xylene is mixed with 15 parts of a solution of 80% strength of a polyamide resin ("Versamid 115") obtained by condensing dimerized unsaturated plant fatty acids with diethylenetriamine in xylene+ethyleneglycol monoethyl ether 1:1. The lacquer solution is applied to aluminum sheet in a thickness of 150 to 200μ. Drying for 1 hour at 20° C., followed by curing for 2 hours at 70° C., produces a very shiny coat which is hard and yet very flexible.

Example 9

An intimate mixture is prepared from 100 parts of the diglycidyl ether obtained as described in Example 2, 12 parts of triethylene tetramine and 4 parts of tris-(1:2:4-dimethylaminomethyl)-phenol. Oak panels measuring 22×9×1 cm. are brushed with this mixture, a glass fiber fabric ("Asl-314" of Messrs. Fibres de Verre, Lausanne) is interposed, and after gelling another coat is applied to the sandwich. A smooth, well adherent protective coat results. A flammability test carried out along the lines laid down in DIN 53382 reveals that the material is still inflammable but is immediately extinguished when the flame is removed from it.

Example 10

An intimate mixture is prepared from 100 parts of the diglycidyl ether manufactured according to Example 2, 15 parts of triethylenetetramine and 2.5 parts of a melamine-formaldehyde condensate etherified with butanol is applied in a thickness of about 250μ to aluminum sheet. At room temperature this coating undergoes curing overnight to form a hard, and yet flexible coat of high lustre.

Example 11

A mixture is prepared from 65 parts of a diglycidyl ether, which is liquid at room temperature, of bis-(4-hydroxyphenyl)-dimethylmethane (containing 5.2 epoxide equivalents per kg.) and 35 parts of the dibrominated diglycidyl ether, prepared as described in Example 2, containing 4.1 epoxide equivalents per kg. The resin mixture is intimately mixed with 11.75 parts of triethylenetetramine as curing agent. A 12-ply glass fiber laminate (A) is manually covered with this mixture, the glass fiber fabric being a "Vertrotex fabric Type 354 AFl" of Messrs. Fibres de Verre, Lausanne. This laminate is then cured for 24 hours at 40° C.

For comparison another laminate (B) is prepared under identical conditions, but in this case the dibrominated diglycidyl ether of Example 2 is omitted.

As shown by the values in the following table, laminate A is self-extinguishing and more water-repellent than laminate B:

| Laminate | Bending strength in kg./mm.² | Bending strength after 10 days' residence in water at 20° C. in kg./mm.² | Water absorption, after 10 days' residence in water at 20° C. in percent | Shape retention on heating accdg. to Martens (DIN), ° C. | Inflammability |
|---|---|---|---|---|---|
| A | 19.0 | 17.0 | 1.15 | 59 | Self-extinguishing. |
| B | 21.3 | 16.9 | 1.42 | 62 | No extinction after removal of flame. |

What is claimed is:
1. Glycidyl ethers selected from the group consisting of compounds of formula

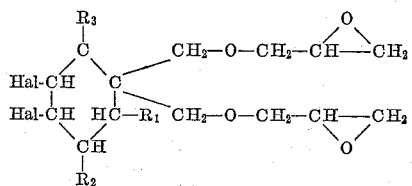

compounds of formula

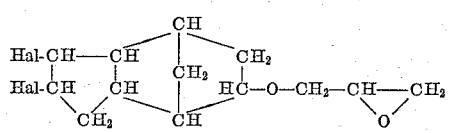

wherein the two radicals Hal each are selected from the group consisting of chlorine atom and bromine atom, $R_1$ is a member selected from the group consisting of hydrogen atom and the methyl group and $R_2$ and $R_3$ are selected from the group consisting of hydrogen atom and together $R_2$ and $R_3$ form the methylene group, compounds of the formula

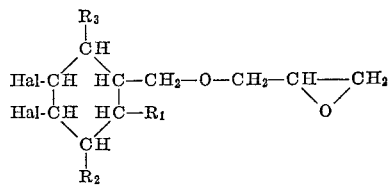

wherein the two radicals Hal each are selected from the group consisting of chlorine atom and bromine atom, $R_1$ is a member selected from the group consisting of hydrogen atom and the methyl group, and $R_2$ and $R_3$ are hydrogen, and compounds of the formula

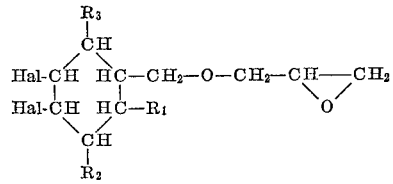

wherein the two radicals Hal each are selected from the group consisting of chlorine atom and bromine atom, $R_1$ is hydrogen, and together $R_2$ and $R_3$ form the methylene group.

2. The compound of the formula

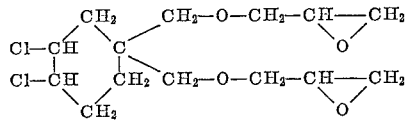

3. The compound of the formula

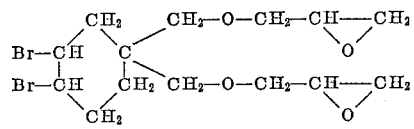

4. The compound of the formula

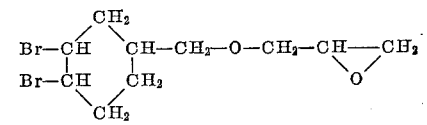

5. The compound of the formula

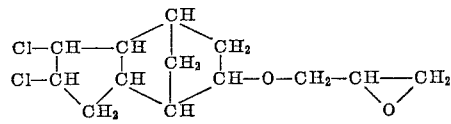

References Cited in the file of this patent
UNITED STATES PATENTS 2,682,547     Clemens et al.  ----------- June 29, 1954
2,992,193     Parret et al.  ------------ July 11, 1961

OTHER REFERENCES

Australian Abstract, 58,311/60, Sept. 15, 1960.

UNITED STATES PATENT OFFICE
CERTIFICATE OF CORRECTION

Patent No. 3,151,129 September 29, 1964

Ernst Leumann et al.

It is hereby certified that error appears in the above numbered patent requiring correction and that the said Letters Patent should read as corrected below.

Column 6, lines 56 to 63, for the upper left-hand portion of the formula reading

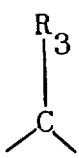   read   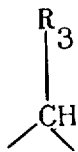

Signed and sealed this 23rd day of February 1965.

(SEAL)
Attest:

ERNEST W. SWIDER
Attesting Officer

EDWARD J. BRENNER
Commissioner of Patents